(No Model.)
G. T. DUNCAN.
CHIN REST FOR HORSES.
No. 496,248. Patented Apr. 25, 1893.
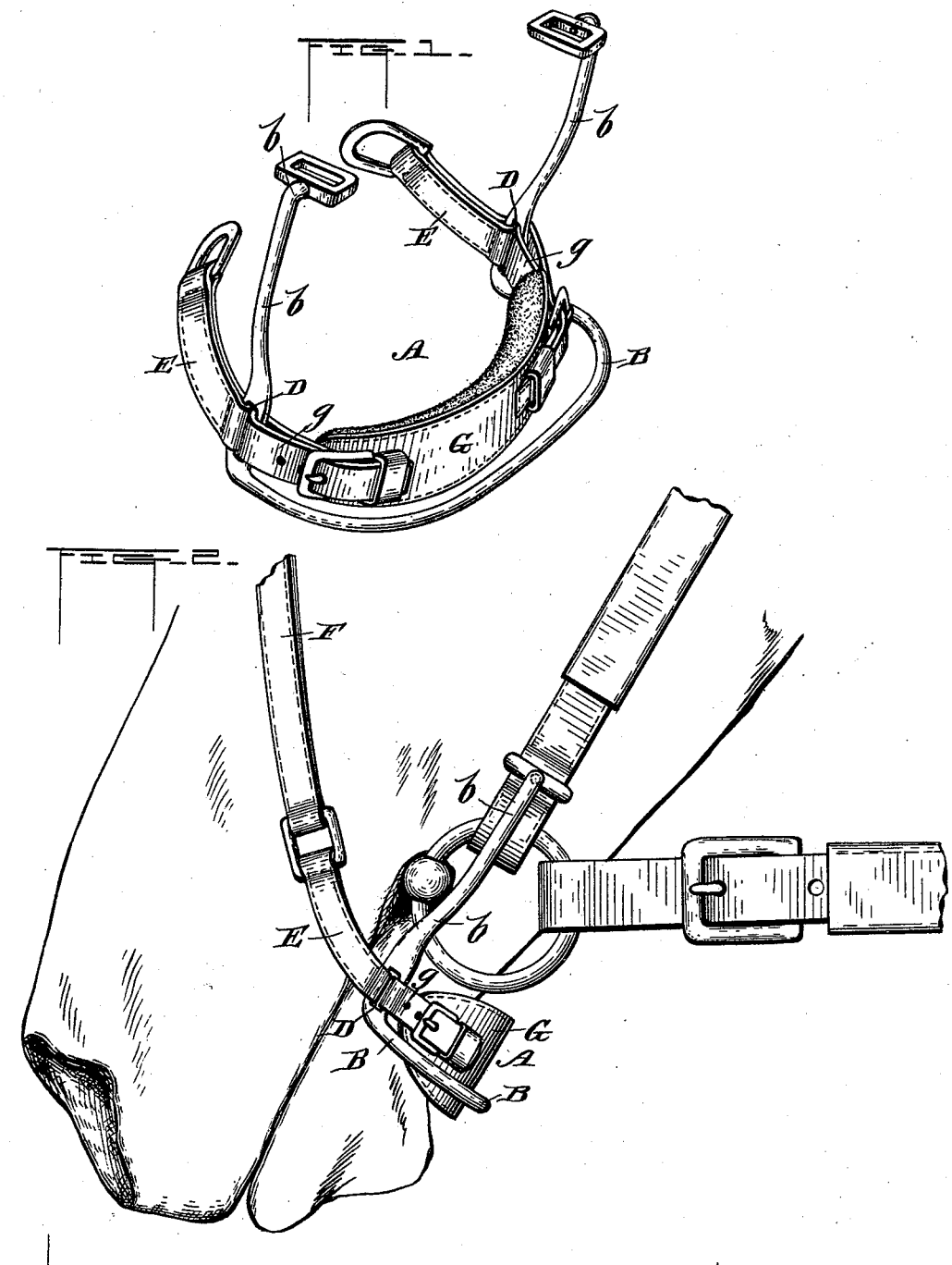

UNITED STATES PATENT OFFICE.

GEORGE T. DUNCAN, OF TACOMA, WASHINGTON, ASSIGNOR OF SEVEN-SIXTEENTHS TO ALBERT F. HOSKA, OF SAME PLACE.

CHIN-REST FOR HORSES.

SPECIFICATION forming part of Letters Patent No. 496,248, dated April 25, 1893.

Application filed December 19, 1892. Serial No. 455,649. (No model.)

*To all whom it may concern:*

Be it known that I, GEORGE T. DUNCAN, a citizen of the United States, residing at Tacoma, in the county of Pierce and State of Washington, have invented certain new and useful Improvements in Chin-Rest Guards for Horses; and I do hereby declare the following to be a full, clear, and exact description of the invention, such as will enable others skilled in the art to which it appertains to make and use the same.

My invention relates to chin rest guards for horses which may be attached to bridles of any description or made part of the bridle or bit, and it consists in certain novel constructions, combinations and arrangements of parts as will be hereinafter described and claimed.

In the accompanying drawings, Figure 1 is a perspective view of my improved chin rest guard and Fig. 2 shows the same applied to the head of a horse in connection with a bridle.

A in the drawings represents my improved chin rest guard for horses and other animals which are driven by means of a bridle and bit, and, as heretofore stated, may be made separate from the bridle and sold to the public to be applied to old bridles, or it may be made a part of the bridle or bit. The chin rest guard consists of a rigid steel or iron wire frame B which is shaped to encircle the under side of the lower jaw of the horse and bent at an approximately right angle to form attaching arms *b* which conform to the outline of the sides of the lower end of the horse's head and extend on both sides of the head and are attached by means of swivel connections to the bridle cheeks. A little above the elbow of the frame, the arms *b* are slotted as shown at D. Through these slots are passed short straps E which connect the chin rest guard with the overdraw strap F.

G represents a curved padded chin rest which receives the horse's chin and is secured by adjustable straps *g* in the slotted passages D as shown, in such a manner that it can swing easily and permit a free movement of the horse's head and be raised and lowered as desired.

The head of the horse can be checked up to the desired extent by shortening or lengthening the overdraw strap in the usual manner. It will be observed that by securing the overdraw to the rigid frame B instead of to the yielding chin rest G, the attaching ends of the chin rest are prevented from coming together and pinching the sides of the horse's mouth when he raises his head or is checked up too high, as would be the case if the rigid frame B were not provided, and the overdraw were connected directly to the chin rest; and also by securing the rigid frame by a swivel connection, the whole device can have an accommodating action corresponding to the movement of the horse's head, and also permit the same to be lowered when the overdraw is unchecked for the purpose of allowing the horse to feed or for the purpose of washing out his mouth.

It will further be observed that by the construction and arrangement described other important results are secured, namely, first, the overdraw bit is dispensed with; second, the whole equipment of the horse's head is kept in better shape, because the driver has free control of the horse's head; third, the overdraw strap is kept away from the nostrils, because the extremities of the circle of the guard are so wide apart that space is left for the nostrils when the horse is checked up; fourth, a greater leverage power is given to the overdraw, because the chin rest lies ahead of the bit, thereby making it easier to steady the horse and especially to speed the same, and, fifth, the headgear will be arranged more humanely, because, as aforesaid, all pinching on the horse's mouth is avoided.

In driving the horse all bit pressure would be exerted by means of the reins in the hands of the driver and the horse thereby permitted to rest or exert a pressure with his head on the padded rest without annoyance or inconvenience to himself, and the horse's head at the same time kept at any desired height.

What I claim as my invention is—

1. A chin rest guard for a horse comprising in its construction a rigid supporting and attaching frame having a lower bent portion which encircles the chin, and suitably bent attaching arms, and a chin support attached to said arms and lying within the lower bent portion of the frame and directly beneath the horse's chin when the guard is applied and means for attaching the guard to the overdraw, substantially as and for the purpose described.

2. A chin rest guard for horses comprising in its construction a suitable supporting and attaching frame having a lower bent encircling portion and arms bent approximately at right angles thereto, and provided with slots and attaching means; and a curved padded chin support provided with adjustable straps and secured in the slots of the arms and adapted to have a swinging movement in the lower curved portion of the frame, substantially as described.

In testimony whereof I hereunto affix my signature in presence of two witnesses.

GEORGE T. DUNCAN.

Witnesses:
 B. B. GATTEL,
 T. DAVIS.